United States Patent [19]
Linder

[11] Patent Number: 5,088,786
[45] Date of Patent: Feb. 18, 1992

[54] PANIC EXIT DOOR MECHANISM

[75] Inventor: John P. Linder, Anaheim, Calif.

[73] Assignee: International Door Closers, Inc., Anaheim, Calif.

[21] Appl. No.: 703,674

[22] Filed: May 21, 1991

[51] Int. Cl.$^5$ .............................................. E05C 9/14
[52] U.S. Cl. ....................................... 292/92; 292/336.3; 292/36
[58] Field of Search ................. 292/36, 21, 92, 173, 292/188, 336.3

[56] References Cited

U.S. PATENT DOCUMENTS

| | | | |
|---|---|---|---|
| 880,600 | 3/1908 | Thompson | 292/173 X |
| 2,910,857 | 11/1959 | Muessel | 292/92 |
| 3,123,387 | 3/1964 | Jackson et al. | 292/21 |
| 3,334,500 | 8/1967 | Bejarano | 70/92 |
| 3,993,335 | 11/1976 | Schmidt | 292/21 |

*Primary Examiner*—Richard E. Moore
*Attorney, Agent, or Firm*—Harris, Kern, Wallen & Tinsley

[57] ABSTRACT

A panic bar mechanism for an exit door having a frame with a stile, upper and lower lock rods vertically sliding in the stile, and a panic bar carried on levers pivotally mounted on the door frame. The mechanism includes a plate mounted in the stile for rotation about a horizontal axis, upper and lower connectors each having a first end attached to the plate on opposing sides of the horizontal axis and each having a second end attached to the upper and lower lock rods, respectively, and a drive pin carried in the lower connector parallel to the horizontal axis, with one or more of the levers having an inner end directly engaging the drive pin for moving the drive pin upward and rotating the plate about the horizontal axis and moving the lock rods vertically. In the preferred embodiment, the mechanism is non-handed, with both levers capable of engaging the drive pin.

3 Claims, 2 Drawing Sheets

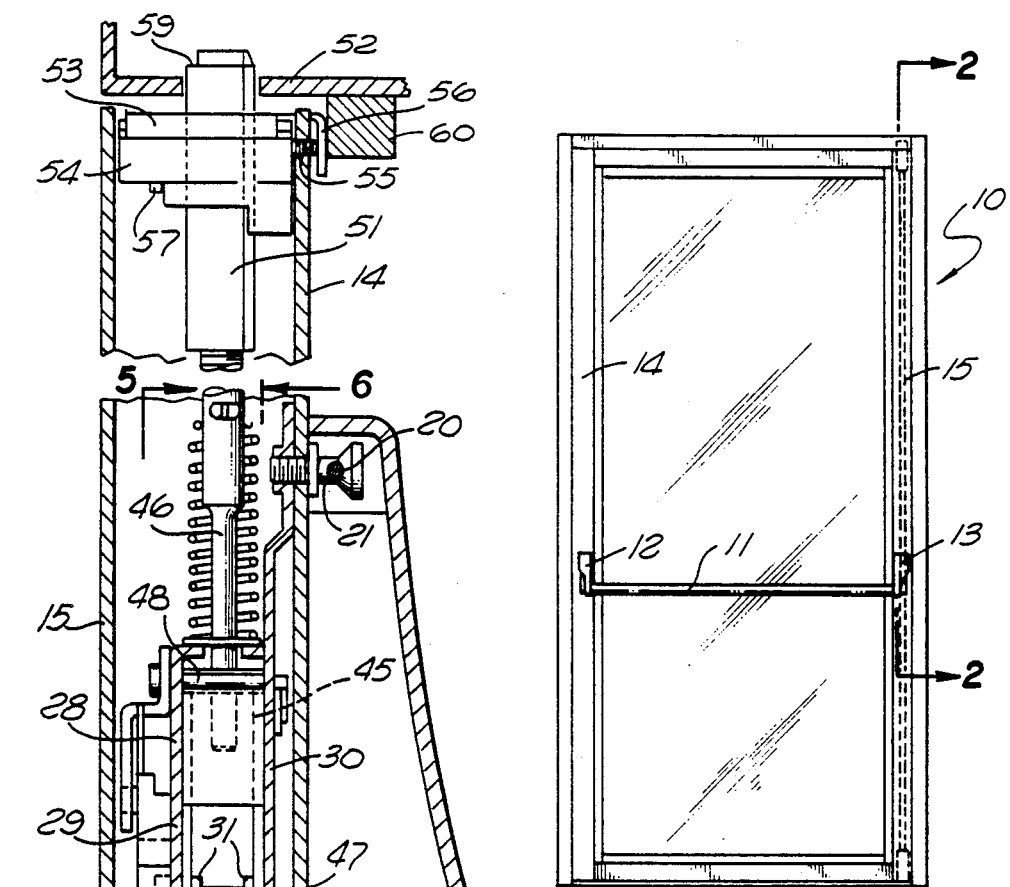
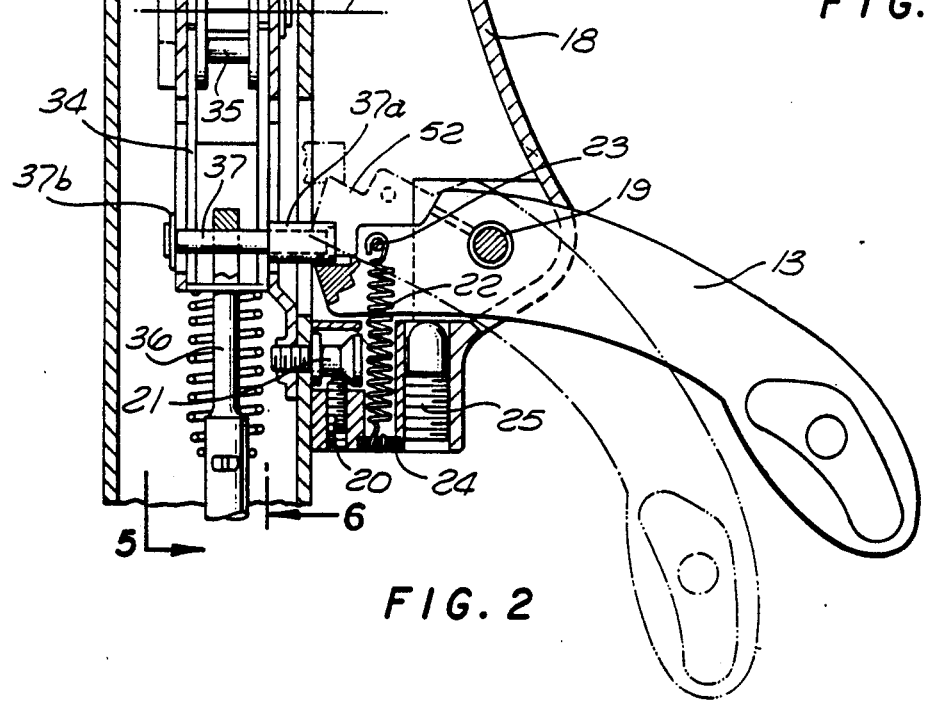
FIG. 1
FIG. 2

PANIC EXIT DOOR MECHANISM

BACKGROUND OF THE INVENTION

This invention relates to exit doors with panic bars and in particular to a new and improved operating mechanism for the door. A typical exit door has a horizontal bar mounted on the door by lever arms, with the bar positioned at about waist height so that it can be operated manually and also can be operated by pressure from the body of a person at the door.

Various panic door operating mechanisms are shown in the prior art. In the U.S. Pat. No. 3,123,387 to Jackson et al., the horizontal bar 34 is carried on levers 33 with an inner end of one of the levers engaging a pin 37 carried in a vertically sliding member 35. Another pin 42 is carried in the sliding member and engages a lower connector 50 which is coupled to an upper connector 53 by a rotating plate 57. Lower and upper vertical rods are attached to the lower and upper connectors, respectively, for moving the ends of the rods out of engagement with lower and upper latch plates.

An alternative arrangement is shown in the U.S. Pat. No. 3,334,500 to Bejarno which utilizes a link 102 between the inner end of the lever and a pin 104, with the pin driving a lower connector.

Another variation is shown in the DOR-O-MATIC design with the inner end of lever engaging a pin carried in the lower connector and with the lower and upper rods coupled to the respective connectors by angle bars.

Another version of panic bar mechanism is shown in the U.S. Pat. No. 3,993,335 to Schmidt. In this design, the inner end of the lever is coupled to a pin in the lower connector by a removable link 100. The lower bar is connected to the same pin, with the upper bar similarly connected to the upper connector, with both connectors coupled to the rotating plate. In all of the models, provision can be made for also rotating the plate by a key actuated lock mechanism.

The links used in prior art designs have a tendency to create weak points and make the installation of the mechanism more difficult. Also the relatively large number of parts in the prior art units increases the possibility of defects and/or malfunction and difficulty in installation and, when not correctly aligned, cause functional problems.

SUMMARY OF THE INVENTION

It is an object of the present invention to provide a new and improved panic bar mechanism which can be less expensive to produce, more reliable in operation and easier to maintain.

It is a particular object to provide such a mechanism wherein the pivoting lever is directly engaged with the pin of the lower connector for direct driving of the lower connector and the lower vertical bar without requiring any intermediate link or rotor or slide plate.

It is a further object of the invention to produce a mechanism which is non-handed and which has fewer parts and avoids links.

Other objects, advantages, features and results will more fully appear in the course of the following description.

The presently preferred embodiment of the panic bar mechanism is used with a door having a frame with a stile, upper and lower lock rods vertically sliding in the stile, and a panic bar carried on levers pivotally mounted on the door frame. The mechanism includes a plate mounted in the stile for rotation about a horizontal axis, upper and lower connectors each having a first end attached to the plate on opposing sides of the horizontal axis and each having a second end attached to the upper and lower lock rods, respectively, and a drive pin carried in the lower connector parallel to the horizontal axis, with one of the levers having an inner end directly engaging the drive pin for moving the drive pin upward and rotating the plate about the horizontal axis and moving the lock rods vertically.

BRIEF DESCRIPTION OF THE DRAWINGS

FIG. 1 is a front view of an exit door incorporating the presently preferred embodiment of the invention;

FIG. 2 is an enlarged partial sectional view taken along the line 2—2 of FIG. 1;

DESCRIPTION OF THE PREFERRED EMBODIMENT

Figure 3:
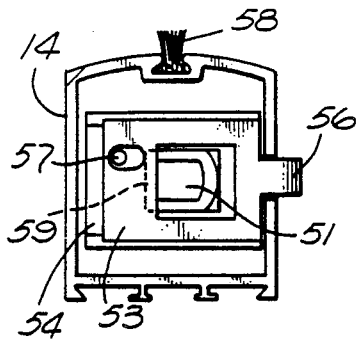
FIG. 3 is a top view of the stile of FIG. 2 with the bolt in the down position.
Figure 4:
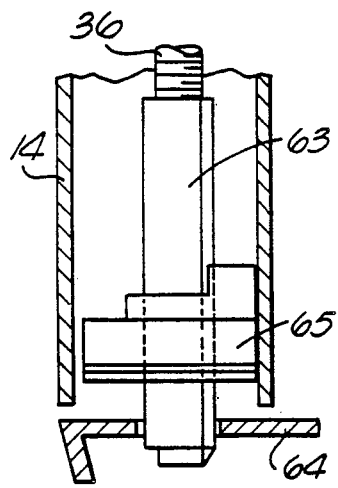
FIG. 4 is a partial sectional view similar to that of FIG. 2 showing the lower vertical lock rod.
Figure 5:
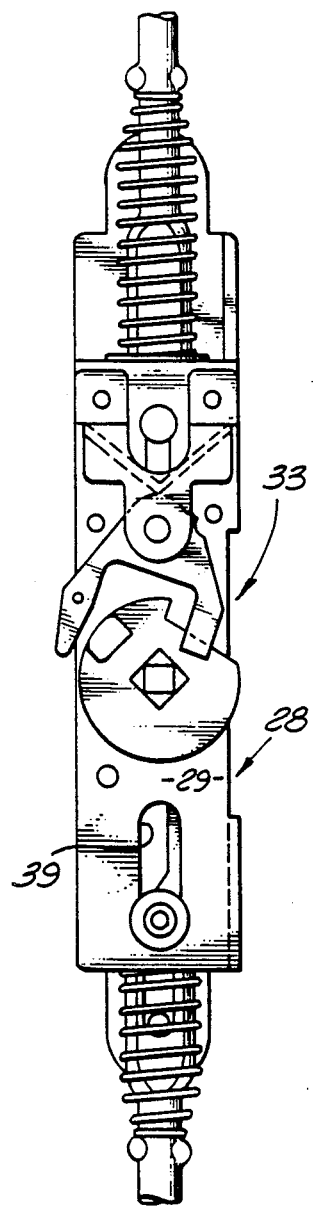
FIG. 5 is a partial sectional view taken along the line 5—5 of FIG. 2.

An exit door 10 is shown in FIG. 1 with a panic bar 11 carried on levers 12, 13 mounted in stiles 14, 15, respectively, of the door frame. The lever 13 is pivotally mounted in a housing 18 by a pin 19, with the housing 18 connected to the stile 15 by set screws 20 engaging mounting bolts 21. One or more springs 22 are connected between a pin 23 on the lever 13 and one or more spring retainer discs 24 in the housing 18 for urging the lever to the upper or door locked position shown in solid lines in FIG. 2.

A stop screw 25 provides for locking the lever in a depressed position when the screw is moved up from the position shown in the drawing, for maintaining the door in an unlocked condition with the panic bar in the phantom line position of FIG. 2.

A mechanism shell 28 with side plates 29, 30 is mounted in the stile with the mounting bolts 21. A U-shaped plate 31 is mounted in the shell 28 for rotation about a horizontal axis 32. A conventional key operated cylinder locking mechanism shown generally at 33 can be incorporated for rotating the plate 31 if desired.

A U-shaped lower connector 34 is coupled to one end of the rotating plate 31 by a pin 35, and is coupled to a lower lock rod 36 by a pin 37 which rides in a slot 38 in the rod. The pin 37 also rides in a slot 39 in the shell 28. In the embodiment illustrated, the pin 37 has a sleeve 37a on one end and a washer 37b on the other end held in place by expanding the hollow end of the pin. A spring 40 is positioned around the upper end of the rod 36 between a washer 41 engaging the lower end of the shell 28 and dimples 42 formed on the rod 36, for urging the rod downward.

Figure 6:
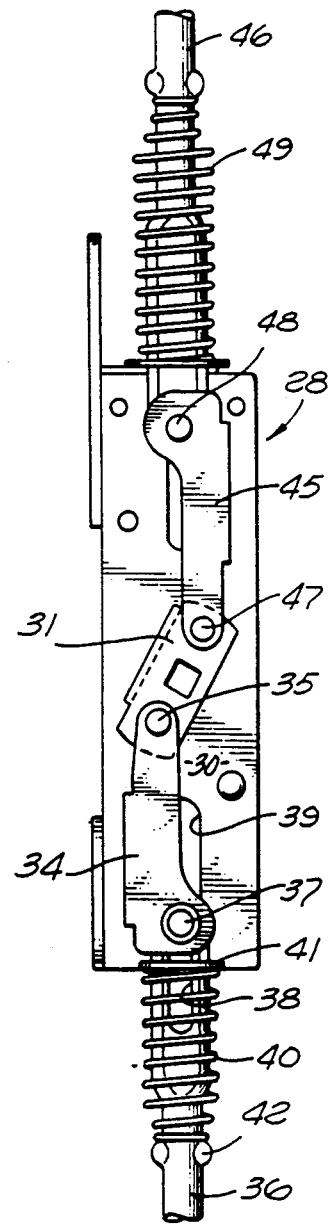
FIG. 6 is a partial sectional view taken along the line 6—6 of FIG. 2.

A U-shaped upper connector 45 is positioned between the rotating plate 31 and an upper rod 46 in a similar manner with pins 47, 48 and spring 49. In operation, rotation of the plate 31 in a clockwise direction as viewed in FIG. 6, moves the lower connector 34 upward and the upper connector 45 downward, thereby moving the lock rods 36, 46 vertically and out of the respective latch plates.

Figure 7:
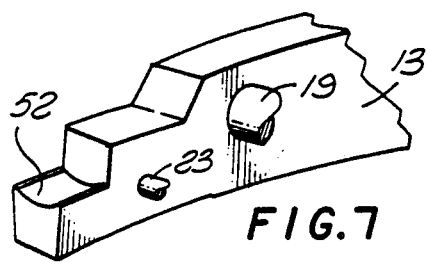
FIG. 7 is a perspective view of the inner end of the lever of FIG. 2.

The inner end of the lever 13 engages the pin 37 as shown in FIG. 2, preferably at a concave surface 52, best seen in FIG. 7. The end of the pin 37 is preferably cylindrical and the surface 52 is generally horizontal for ease of engagement with the pin end. With this arrangement, the panic bar is easily mounted on the door stiles by simply positioning the housings 18 on the respective stiles with the inner end of the lever 13 below the pin 37, and fastening the housings in place by the set screws.

A bolt 51 is carried at the upper end of the rod 46 for engaging a strike 52 in the wall. A latch 53 slides horizontally on a support block 54 mounted in the stile 14. A spring 55 is positioned in the block 54 and engages a tongue 56 of the latch 53, urging the latch outward to the right as viewed in FIGS. 2 and 3. A pin 57 in the block 54 limits the outward movement of the latch. A seal 58 may be positioned in a groove in the stile, if desired.

When the panic bar is depressed, the bolt 51 is moved downward out of engagement with the strike 52 with a notch 59 at the upper end of the bolt going below the latch 53. The spring then moves this latch to the right over the notch of the bolt, holding the bolt in the downward condition of FIG. 3.

When the door swings from the open position of FIG. 3 to the closed position of FIG. 2, the tongue 56 of the latch engages a stop 60 adjacent the strike 52, compressing the spring and moving the latch to the left. This motion releases the bolt and permits it to move upward to engage the strike as shown in FIG. 2.

Another bolt 63 is carried at the lower end of the lock rod 36 for engaging another strike 64. The bolt 63 slides in a similar support block 65 mounted in the stile 14. No corresponding latch is utilized at the lower end of the door in this embodiment.

In operation, the door is normally latched with the bolts at the ends of the rods 36, 46 engaging the respective latch plates. A downward pressure on the panic bar 11 permits downward movement of the panic bar and clockwise rotation of the levers as viewed in FIG. 2, against the urging of the springs 22. Engagement of the inner end of the lever with the pin 37 directly moves the lower rod 36 upward and the connector 34 upward. This produces a clockwise rotation of the plate 31 as viewed in FIG. 6, moving the connector 45 and the rod 46 downward, thereby releasing the door locks. Further pressure on the panic bar 11 swings the door open. A conventional door closure mechanism is usually incorporated in the installation so that when pressure on the panic bar 11 is released, the door will swing back to the closed position.

In the preferred embodiment the inner ends 52 of both levers 12, 13 are identical so that the same set of levers can be used for a door with the lock rods in either stile, i.e., the construction is non-handed.

I claim:

1. In a panic bar mechanism for an exit door having a frame with a stile, upper and lower lock rods vertically sliding in said stile, and a panic bar carried on levers pivotally mounted on said door frame, the improvement including in combination:

a plate mounted in said stile for rotation about a horizontal axis;

upper and lower connectors each having a first end attached to said plate on opposing sides of said horizontal axis and each having a second end attached to said upper and lower lock rods, respectively;

a drive pin carried in said lower connector parallel to said horizontal axis and projecting outward from said stile through a slot in said stile and perpendicular to the plane of said door, with one of said levers having an inner end positioned underneath and directly engaging said drive pin for moving said drive pin upward only and rotating said plate about said horizontal axis and moving said lock rods vertically, with said inner end terminating externally of the stile;

with said connector second ends attached to said respective lock rods by horizontal lock rod pins, with said drive pin one of said lock rod pins; and spring means connected between said lever inner end and said frame for urging said lever inner end away from said drive pin.

2. A mechanism as defined in claim 1 having two of said levers, with each of said levers having an inner end for directly engaging said drive pin.

3. A mechanism as defined in claim 1 wherein said drive pin is cylindrical and said lever inner end has a generally horizontal section with an upwardly facing generally concave surface for engaging said drive pin.

* * * * *